United States Patent [19]
Tappeiner et al.

[11] 3,820,003
[45] June 25, 1974

[54] METHOD OF CONTROLLING A PULSE INVERTER FOR AN INDUCTION MACHINE

[75] Inventors: Hermann Tappeiner; Hermann Waldmann; Karl-Heinz Bayer; Manfred Wiebelzahl, all of Erlangen, Germany

[73] Assignee: Siemens Aktiengesellschaft, Berlin, Germany

[22] Filed: Mar. 13, 1972

[21] Appl. No.: 233,956

[30] Foreign Application Priority Data
Mar. 13, 1971 Germany............................ 2112186

[52] U.S. Cl...................... 321/5, 321/9 A, 318/227
[51] Int. Cl. ........................................... H02m 7/00
[58] Field of Search ................ 321/5, 9 A; 318/227

[56] References Cited
UNITED STATES PATENTS

| | | | |
|---|---|---|---|
| 3,445,742 | 5/1969 | Moscardi............................ | 321/9 A |
| 3,585,488 | 6/1971 | Gutt et al............................ | 321/9 A |
| 3,614,590 | 10/1971 | Kernick............................... | 321/9 A |
| 3,624,486 | 11/1971 | Oates.................................. | 321/9 A |
| 3,662,247 | 5/1972 | Schieman............................ | 321/9 A |

FOREIGN PATENTS OR APPLICATIONS

| | | | |
|---|---|---|---|
| 102,955 | 10/1962 | Netherlands....................... | 321/9 A |
| 1,230,489 | 12/1966 | Germany............................ | 321/9 A |

*Primary Examiner*—William M. Shoop, Jr.
*Attorney, Agent, or Firm*—Herbert L. Lerner

[57] ABSTRACT

A method controls a pulse inverter for controlling the speed of induction machines such as asynchronous machines. To provide the control signals for the inverter, the point of intersection of a periodic reference curve whose frequency corresponds to the desired fundamental oscillation frequency of the output voltage of the inverter is provided with a determinable number (1 to $n$) of DC voltage levels ($a_1$ to $a_n$). The DC voltage level positions are controllable according to a desired rule or principle in dependence on a control voltage ($U_{St}$) whose level depends on the desired amplitude of the fundamental oscillation.

7 Claims, 5 Drawing Figures

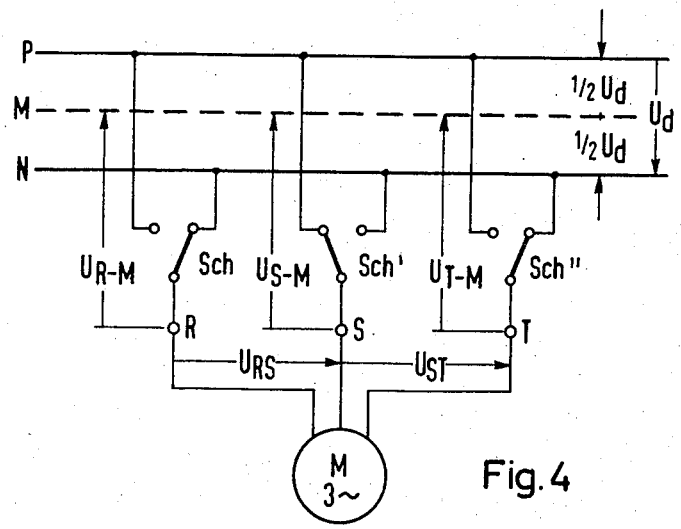
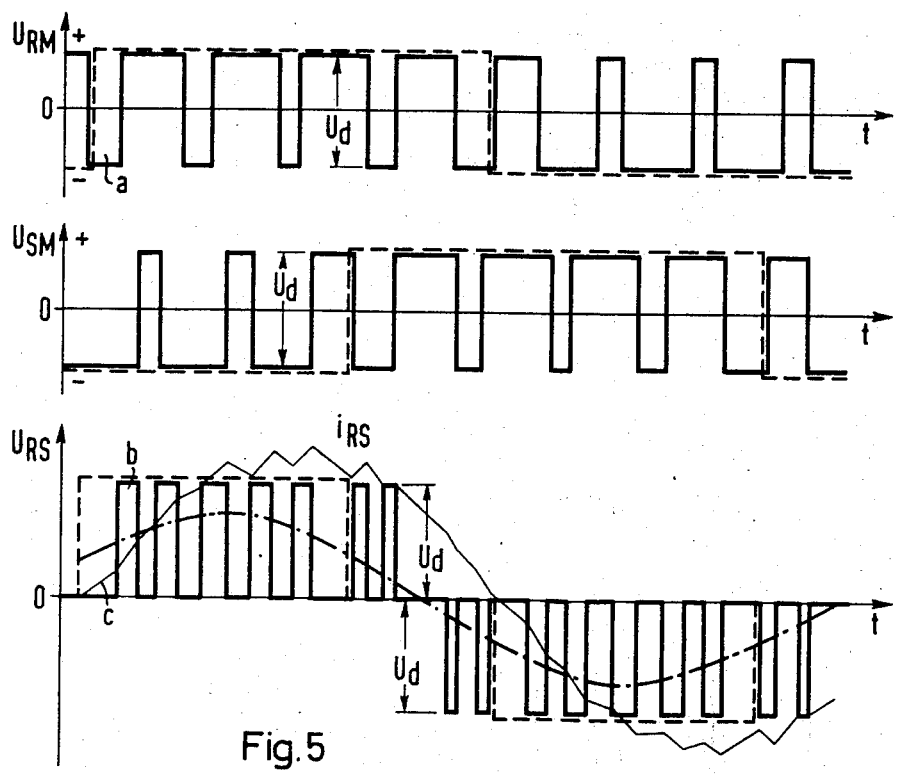

3,820,003

METHOD OF CONTROLLING A PULSE INVERTER FOR AN INDUCTION MACHINE

DESCRIPTION OF THE INVENTION

The present invention relates to a method for controlling a pulse width modulated inverter for controlling induction machines. More particularly, the invention relates to a method for controlling a pulse width modulated inverter for asynchronous machines.

It is known to control the inverter of an induction machine by providing a pulse duration modulation of a constant DC voltage by utilizing pulse inverters, so that the voltage and the frequency are variable.

The disadvantage of the known method of control is that synchronization between a reference voltage and the pulse image is not possible during rapid changes in frequency, for example, or may be provided only at great cost, particularly if the reference curve is externally determined by the regulation.

An object of the invention is to provide a method of controlling a pulse width modulated inverter for an induction machine, which method reliably provides the necessary synchronization with little expenditure.

Another object of the invention is to provide a method of controlling a pulse width modulated inverter for an induction machine, which method provides greater freedom for the pulse image in order to provide an optimum utilization of the available DC voltage of the inverter.

To accomplish this, and in accordance with the invention, a method controls a pulse width modulated inverter for the speed control of an induction machine such as an asynchronous machine. In order to produce control signals for the inverter, the point of intersection of a periodic reference curve whose frequency corresponds to the desired fundamental frequency of the inverter output voltage is provided with a determinable number of DC voltage levels. The DC voltage levels may be controlled in position according to a desirable rule or principle in dependence upon a control voltage whose level depends on the desired amplitude of the fundamental oscillation.

The reference curve is preferably a sinusoidal function of constant amplitude, but may also be a sawtooth, triangular or trapezoidal curve.

In accordance with another feature of the invention, the control voltage whose level corresponds to the desired amplitude of the fundamental oscillation is applied to the input of an amplifier chain whose outputs define two desired DC voltage levels. The number of levels may be one or may be increased through appropriate multiplication of the stages of the amplifier chain.

The variable DC voltage levels should be positioned to provide a maximum number of fundamental oscillations and a minimum number of harmonics of the inverter output voltage.

In order that the invention may be readily carried into effect, it will now be described with reference to the accompanying drawings, wherein:

FIG. 4 is a circuit diagram of an embodiment of a three-phase pulse inverter; and FIG. 5 is a graphical presentation of voltage and current curves appearing in the pulse inverter of FIG. 4.

Figure 1:
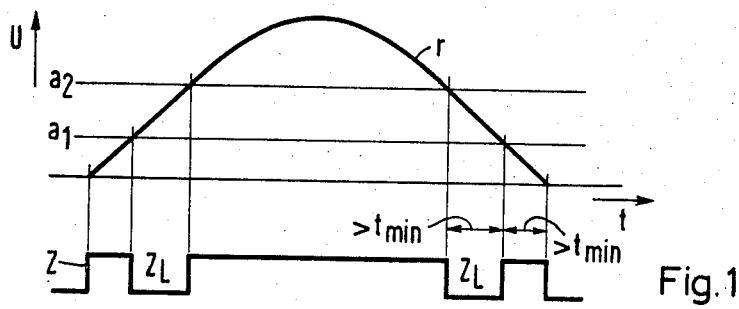
FIG. 1 is a graphical presentation illustrating the production of a control signal by the method of the present invention.
Figure 2:
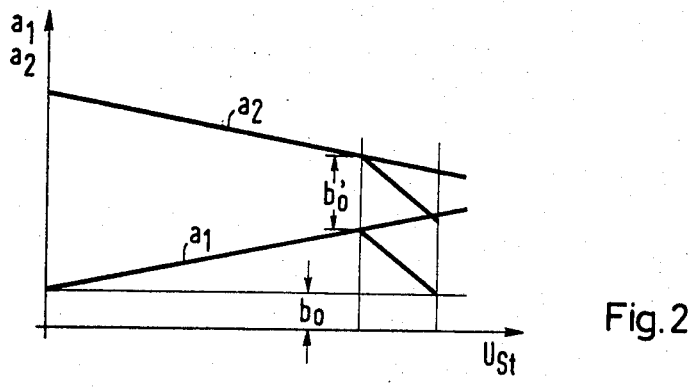
FIG. 2 is a graphical presentation illustrating the positioning of a pair of DC voltage levels of the method of the invention.

As indicated in FIG. 1, the formation of control signals which are used for the pulse width modulation of the output AC potential of a pulse inverter is obtained by comparing a reference potential curve r with DC potential levels whereby, for instance, their number $n = 2$, as at $a_1$ and $a_2$, which are generated in accordance with certain predetermined conditions in dependence upon a control potential $U_{st}$ (see FIG. 2). As FIG. 1 illustrates, the control signal is formed by intersecting a standard sinusoidal reference voltage r with the two voltage DC potential levels $a_1$ and $a_2$.

The reference potential curve r is compared with the direct current potential $a_1$ and $a_2$. In the case of a potential coincidence, threshold control circuits come into operation (not shown). Thereby a series of ignition or control pulses is formed, shown as a control impulse image Z in the lower part of FIG. 1.

The two DC voltage levels $a_1$ and $a_2$ are drawn in FIG. 1. In FIG. 1, the abscissa represents the time $t$. It is assumed that the DC voltage levels $a_1$ and $a_2$ are constant with respect to time, which means that their common control voltage $U_{st}$ (see FIG. 2) is fixed ($U_{st}$ = constant). In FIG. 2, this corresponds to a fixed value of the control voltage on the $U_{st}$ axis, for example, at the point where $b$ appears. Actually, both levels $a_1$ and $a_2$ in FIG. 1 may be shifted from the zero line in the same or opposite directions, but, in any event, together. The shifting or displacement occurs in dependence upon the common control voltage $U_{st}$. The levels $a_1$ and $a_2$ may thus be guided in dependence upon the control voltage $U_{st}$.

When two levels $a_1$ and $a_2$ are utilized, three pulses and two pulse gaps or spaces $Z_L$ are always provided for each half wave of the reference voltage $r$, as shown in FIG. 1 in the control pulse train Z, as long as the levels $a_1$ and $a_2$ are smaller than the amplitude of the reference voltage $r$.

FIG. 2 is an example of the variation of the two DC potential levels $a_1$ and $a_2$ as a function of the control potential $U_{st}$. FIG. 2 thus illustrates how the levels $a_1$ and $a_2$ vary in dependence upon the control voltage $U_{st}$. The variation occurs in a straight line. Thus, for example, a change in the control voltage $U_{st}$ starting at the point of $b$ in FIG. 2, up to the point where a first control section I borders a second control section II, produces the result in FIG. 1 that the level $a_2$ is lowered and the level $a_1$ is raised. This results in the two pulse gaps or spaces $Z_L$ in the control pulse train Z being shortened in time and the two outer pulses being prolonged with respect to time (FIG. 1). In this manner, the output voltage of the inverter is controlled via the ignition pulses.

Each level $a_1$ and $a_2$ intersects each half wave of the reference voltage $r$ at two intersecting points, as long as the height of the levels $a_1$ and $a_2$ is not exactly equal to the amplitude of the reference voltage $r$. In such circumstance, there is only one intersecting point in a half wave.

In the first control section I, the distance $b'$ of the two DC potential levels $a_1$ and $a_2$ decreases uniformly with increasing control potential $U_{st}$. Thereby, as shown in FIG. 1, the two pulse gaps $Z_L$, having a width $t'$ as in FIG. 1, decrease until they have attained a permissible minimum duration $t'_{min}$. This minimum duration $t'_{min}$ corresponds to the minimum distance of the potential value of $b'_o$ of the two DC potential levels $a_1$ and $a_2$, as in FIG. 2.

After attaining the minimum duration $t'_{min}$, the two pulse gaps $Z_L$, of FIG. 1 may be displaced, as shown in the second control section II (FIG. 2), while maintaining their minimum duration $t'_{min}$ by means of a simultaneous and parallel decrease of the DC potential levels $a_1$ and $a_2$, respectively, in the direction toward the zero passage points of the reference potential curve $r$. This displacement may be carried out with the aid of the control potential $U_{st}$ until such a time when a predetermined minimum distance in time $t_{min}$ has been attained with respect to the zero passage points. This minimum distance in time $t_{min}$ corresponds to the minimum potential value $b_o$ as shown in FIG. 2 for the lower DC potential $a_1$.

Such a method thus provides two advantages. The resulting control pulse train Z is automatically in synchronism with the reference potential curve $r$. Furthermore, as a result of appropriate positioning of the DC potential levels $a_1$ and $a_2$, as in the control section II, a good utilization of the available DC potential supply for the pulse inverter for the production of a high base frequency voltage may be obtained.

If $n=4$ levels ($a_1$, $a_2$, $a_3$, $a_4$), instead of $n=2$, is provided in the control pulse train Z of FIG. 1, five pulses are provided instead of three and four pulse gaps or spaces $Z_L$ are provided instead of two, for each half wave of the reference voltage $r$. This means that, for example, in FIG. 1, the switch Sch of FIG. 4, which is controlled by the control pulse train Z, is switched four times from P to M and back for a half wave. Thus, for each half wave, the voltage $U_{RM}$ of FIG. 5 also jumps four times from "+" to "−" and four negative voltage-time surfaces are produced. The voltage $U_{RM}$ of FIG. 5 therefore corresponds in the time curve to the produced control pulse train Z.

Figure 3:
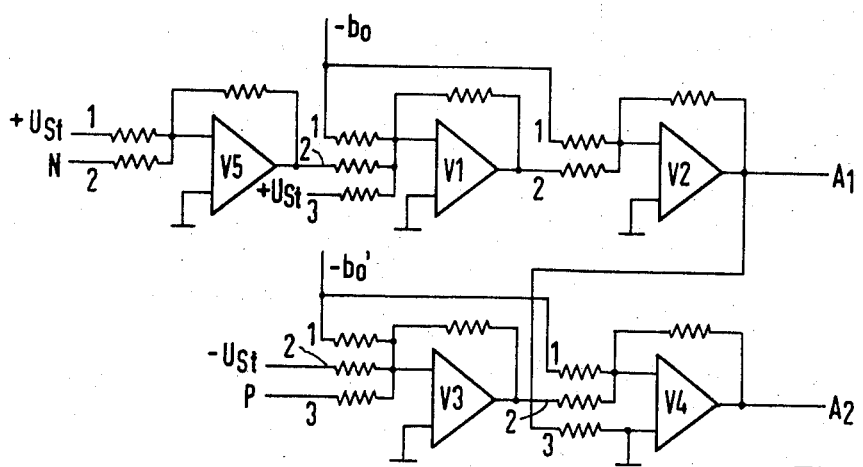
FIG. 3 is a block diagram of an embodiment of a circuit for positioning the DC voltage levels.

FIG. 3 indicates how level control according to FIG. 2 may be realized with the aid of amplifiers V1 through V5.

In accordance with FIG. 3, a positive control voltage $U_{st}$ is provided at the input 1 of the amplifier V5 and a negative bias potential $N_o$ at the input terminal 2. The output of the amplifier V5 is applied to input 2 of amplifier V1. The negative minimum potential $b_o$ is applied to the input 1 of the amplifier V1 and positive control voltage $U_{st}$ is applied to its input 3. The output of the amplifier V1 is applied to input 2 of amplifier V2, whose input 1 also receives the negative minimum potential $b_o$. The output of the amplifier V2 is connected to the output terminal $A_1$ and also to the input 3 of the amplifier V4. The output of the amplifier 4 is connected to output terminal $A_2$ and its input 1 is provided with the negative minimum potential value $b_o$, the input 2 of the amplifier V4 being connected to the output of amplifier V3. The input 1 of amplifier V3 also receives the negative of the minimum potential difference value $b_o$. Negative control potential $U_{st}$ is applied to the input 2 of the amplifier V3, while a positive bias potential $P_o$ is applied to its input 3. The desired DC potential levels $a_1$ and $a_2$ are thus obtainable at the outputs $A_1$ and $A_2$.

FIG. 4 is a generalized circuit diagram of a three-phase pulse inverter, wherein the variation of the frequency and of the output AC potential is a result of pulse width modulation with a constant DC supply potential. The pulse inverter may be conceived as a combination of periodically operating switches Sch, Sch' and Sch''. In the inverter of FIG. 4 which comprises a three-phase AC output, the switches Sch, Sch' and Sch'' alternatively connect the positive polarity terminal P and the negative polarity terminal N of a DC voltage source, providing a DC supply voltage $U_d$, to terminals R, S and T of an induction machine M. The electrical control unit functions to periodically change the position of the switches Sch, Sch' and Sch'' such that a three-phase symmetrical AC potential system obtains between terminals R, S and T having a fundamental wave of predetermined frequency and amplitude.

FIG. 5 illustrates an example of the potential and current variations with pulse width modulation in accordance with the invention, wherein, in contrast to FIGS. 1 and 2, $n=4$ potential levels ($a_1 \ldots a_n$) are being used. The graphs B1 and B2 indicate respectively the variation of potentials $U_{RM}$ and $U_{SM}$ at the two terminals R and S referred to middle point M of the DC potential (FIG. 4).

Graph B3 illustrates the corresponding conductor potential $U_{RS}$ and graph c shows the load current, as it would circulate, for example, as current $i_{RS}$ in the winding conductor of an induction machine M in delta connection. It will be seen from FIG. 5 that the conductor potential $U_{RS}$ (graph B3), in addition to the fundamental wave portion shown in dot-dash representation, necessarily includes harmonics of various frequencies. Such potential harmonics cause current harmonics in the induction machine M which constitute an additional load. The pulse width modulation, that is to say, the disposition of the individual pulses in the conductor potential $U_{RS}$ in respect to width and position through the control of the DC potentials $a_1$ through $a_n$, which may be varied in respect to amplitude, is accordingly to be carried out such that there is provided a maximum base frequency content and a minimum harmonic content in the output AC potential of the pulse inverter. Any remaining harmonics should possess such a high frequency, that the harmonic currents will be held to a very small value by means of the stray reactance present in the induction machine M. A high base frequency content in the conductor potential $U_{RS}$ may be obtained when individual pulse widths are varied in proportion to the corresponding instantaneous values of the base frequency. The desired base frequency is predetermined by the reference potential curve $r$.

The control pulse train Z having the four pulse gaps $Z_L$ (FIG. 1) is supplied as a control signal to the switch Sch' of FIG. 4. However, it is displaced by one third of a period, corresponding to 120°, with respect to time. In this case, it is delayed. This provides for the voltage $U_{SM}$ in FIG. 5, the same voltage curve as for the voltage $U_{RM}$. The difference is that the voltage $U_{SM}$ is shifted by one third of a period on the time axis (to the right). This is seen at B1 and B2 of FIG. 5 in the simplest manner by comparing the curves shown in broken lines with each other. The coordinated conductor voltage $U_{RS}$ which is measured between the terminals R and S in FIG. 4, is derived simply by subtraction: $U_{RS} = U_{RM} - U_{SM}$. The thus established curve of the conductor voltage $U_{RS}$ is illustrated in diagram B3 of FIG. 5.

The method hereinabove described for the formation of pulse width modulated control signals provides great latitude in respect to the selection of the impulse graph Z and thereby of the switch timing periods for the pulse inverter, whenever the reference potential curve $r$ is scanned by means of a system of DC potential levels $a_1 \ldots a_n$. The reference potential curve $r$ for this purpose, together with the required base frequency, is provided with a constant amplitude. Through a corresponding selection of the number and control of the DC potential levels $a_1 \ldots a_n$, any suitable control pulse image and thereby any desired characteristic of the output AC potential may be obtained.

An important factor in judging the modulation method is the maximum obtainable fundamental oscillation amplitude of the inverter output voltage. It has a close relationship to the characteristics of the inverter. FIG. 5 shows the voltage curve in non-modulated operation. The conductor voltage comprises voltage segments of 120° duration. This form of voltage can provide the highest effective fundamental oscillation value at a predetermined DC supply voltage. It develops from the form of the modulated voltage, since the intervals of opposite potential disappear in the curve paths $a$. Such a transition is not continually possible in practice, since a minimum switching period must be maintained between two switching operations of an inverter phase, which takes into account the duration of the commutation process.

A sudden transition to the non-modulated state is usually not permissible, particularly during a regulated operation of thyristor inverters. During modulated operation, the fundamental oscillation amplitude which corresponds to the voltage segment of 120° duration may almost be reached. The lower the number of switching operations in each half-oscillation, the better the resultant approximation. Thus, the voltage utilization increases with each decreasing pulse frequency. Furthermore, according to the laws of harmonic analysis, an increase in the fundamental oscillation amplitude occurs as the distance of the switching times, and thus, of the remaining voltage segments, increases starting from the center of the fundamental oscillation half-period.

While the invention has been described by means of a specific example and in a specific embodiment, it should not be limited thereto, for obvious modifications will occur to those skilled in the art without departing from the spirit and scope of the invention.

We claim:

1. A method of controlling a pulse width modulated inverter having switch means for the control of the speed of an induction machine, said method comprising the steps of producing a predetermined number n of DC voltage levels of different magnitudes, producing a periodic reference potential having a frequency corresponding to the desired fundamental oscillation frequency of the output voltage of the pulse width modulated inverter;

intersecting said periodic reference potential with the DC voltage levels to determine the pulses of the control signals for the pulse width modulated inverter;

controlling the switch means of the pulse width modulated inverter in dependence upon said control signals; and controlling the positions of the DC voltage levels in accordance with a predetermined rule in dependence upon a control voltage $U_{st}$ having a level which depends on the desired amplitude of the fundamental oscillation of the output voltage.

2. The method claimed in claim 1, wherein the reference potential (r) comprises a sinusoidal curve of constant amplitude.

3. The method claimed in claim 1, wherein the reference potential (r) comprises a sawtooth curve.

4. The method claimed in claim 1, wherein the number of DC voltage levels having a magnitude greater than zero Volts is at least one.

5. The method claimed in claim 1, further comprising positioning the DC voltage levels ($a_1$ to $a_n$) to provide a maximum fundamental frequency content and a minimum harmonic content of the inverter output voltage.

6. The method of claim 1, wherein the reference potential comprises a triangular curve.

7. The method of claim 1, wherein the reference potential comprises a trapezoidal curve.

* * * * *